C. H. VARLEY.
ROTARY ENGINE OR PUMP.
APPLICATION FILED AUG. 31, 1920.
1,378,065.
Patented May 17, 1921.
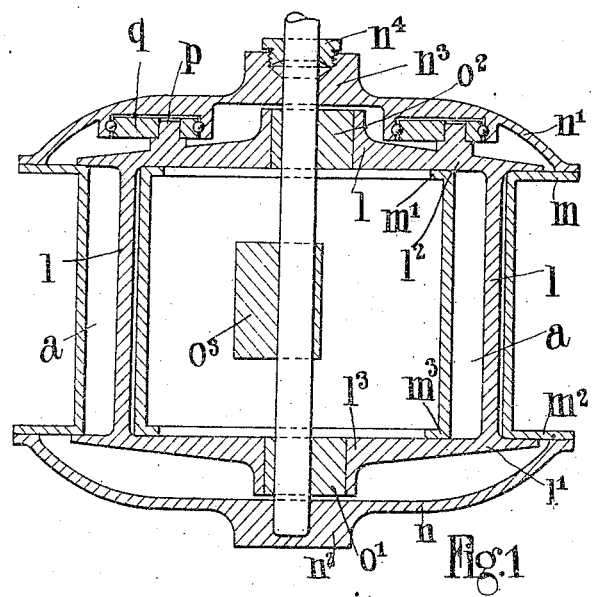
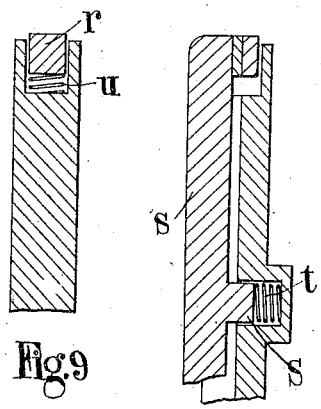
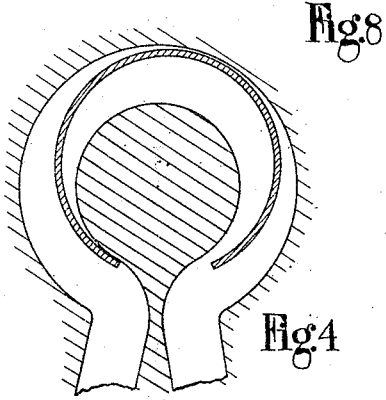
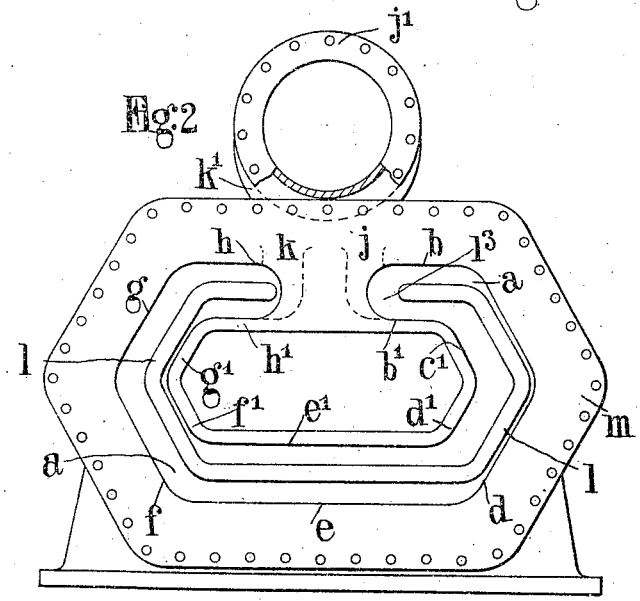
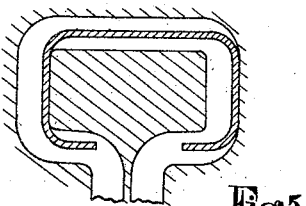
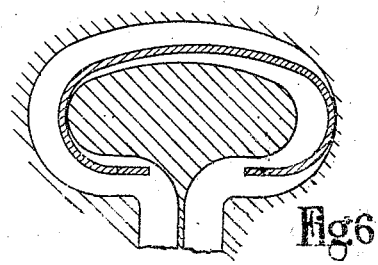
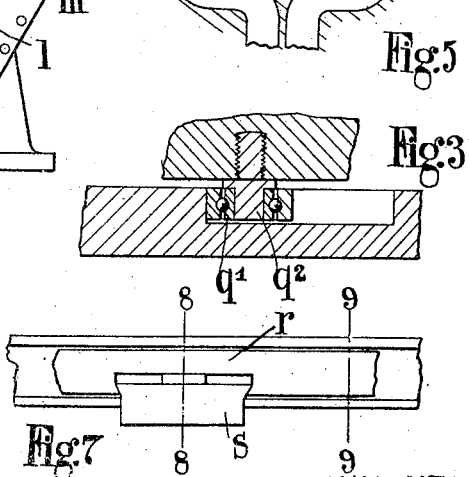
INVENTOR
BY C. H. Varley

UNITED STATES PATENT OFFICE.

CROMWELL HANFORD VARLEY, OF CHILWORTH HILL, NEAR GUILDFORD, ENGLAND.

ROTARY ENGINE OR PUMP.

1,378,065. Specification of Letters Patent. Patented May 17, 1921.

Application filed August 31, 1920. Serial No. 407,259.

*To all whom it may concern:*

Be it known that I, CROMWELL HANFORD VARLEY, a subject of the King of Great Britain and Ireland, and residing at Chilworth Hill, near Guildford, in the county of Surrey, England, have invented certain new and useful Improvements in Rotary Engines or Pumps, of which the following is a specification.

This invention relates to the coöperation of fluids and moving mechanical actuation elements or restraining surfaces say, for example, for pumping as in rotary displacer pumps or like fluid actuating or actuated appliances.

The object of the present invention is to provide an improved mechanism for such purposes.

The invention consists in fluid actuating or actuated mechanism comprising a displacement element movable in a conduit for maintaining a traveling zone of contact with the walls thereof in which the longitudinal outlines of the conduit and the displacing element are given either a curvilinear or such other form as to simplify the actuating or controlling mechanism and packing.

The invention further consists in means for operating in accordance with the preceding paragraph, said means comprising an annular conduit provided with adjacent inlet and outlet branches and a displacement element in the form of an open ring or band of suitable contour contacting substantially upon opposite sides respectively with the inner and outer walls of the conduit and adapted while maintaining its form so to move in said conduit that the opposite contacting zones follow continually around the path.

The invention further consists in providing flat approximating or contacting surfaces adapted for effecting packing through resilient packing pieces during any desired angle of suction and delivery.

The invention further consists in the operation of a displacer element according to the preceding paragraphs by means of a plurality of crank elements directly engaging points on the displacer element and rotating in circles of a diameter equal to the distance said displacer moves from contact with one side to contact with the other side of the conduit; one or more of such cranks may be actual driving cranks, the others acting merely as guides constraining the movement of every part in a circle.

The invention also consists in improvements in fluid actuating and actuated mechanism as hereinafter described.

Referring to the accompanying drawings:

Figure 1 is a transverse section of one form of pumping mechanism in accordance with this invention.

Fig. 2 is an outside view with the cover removed.

Fig. 3 is a section through an alternative form of guiding means.

Figs. 4, 5 and 6 are diagrams showing three alternative forms of conduit with displacing elements therein.

Fig. 7 shows one form of packing which may be employed in connection with the invention.

Fig. 8 is a section on line 8 of Fig. 7, and Fig. 9 is a section on line 9 of Fig. 7.

Figs. 1 and 2 show the invention carried into effect in one convenient form, say for example, for a pumping mechanism, and in this construction an annular shaped conduit $a$ is constructed in an elongated hexagonal or six-sided form. The interior of the conduit constitutes a continuous series of surfaces or walls $b\ b'$, $c\ c'$, $d\ d'$, $e\ e'$, $f\ f'$, $g\ g'$ and $h\ h'$ flat for the greater portion of their length and symmetrically arranged about a common transverse axis at which is positioned the driving shaft $i$.

The inlet and outlet branches $j$ and $k$ for the conduit are located closely adjacent each other, the former having a flange $j'$ in front and the latter a flange $k'$ behind the casing. The branches of the conduit may be formed as part of or may be suitably connected to the conduit and are preferably of such a shape as to reduce the fluid friction at the suction and discharge to a minimum.

The actuation or displacing element is in the form of a rigid band or bolt $l$ of suitable thickness and corresponding in shape to the path taken by the conduit $a$. The band is adapted to move freely within the breadth of said conduit as hereinafter described.

Connected to the edges of this band are closing plates $l'$, $l^2$, forming sides which terminate the width of the conduit; the plate $l'$ may be formed integral with the band $l$ while the other plate $l^2$ is detachably connected thereto; the inner surfaces of both plates being faced and forming a substantially tight joint with the outer faces of the flanges $m$, $m'$, $m^2$ and $m^3$ projecting from the edges of the walls of the conduit.

The displacing element $l$, $l'$, $l^2$, when connected together constitutes a six sided chamber with projecting external flanges and an aperture in one of its sides at $l^3$ forming an open space equal in width to the distance between the inlet and outlet branches plus the movement of the displacer and the necessary clearances. The dimensions and thickness of the displacing element are such that when it is in the conduit at any position of its movement the interior side of the band will be in contact with some portion of the inner wall of the conduit while the exterior side of the band will be in contact with a portion of the outer wall of the conduit remote from the first region of contact. In some cases contact regions may be exactly opposite but their distance apart will vary with the shape or outline of the conduit and position of the displacing element.

The conduit casing is provided with suitably shaped covers $n$, $n'$ for incasing the plates $l'$, $l^2$ of the displacing element, said covers being attached to the outer periphery of the flanges $m$ and $m^2$ and provided with two central bearings $n^2$, $n^3$ upon opposite sides for the reception of the driving shaft $i$ that is arranged to impart motion to the displacing element by means of two eccentrics $o'$, $o^2$ corresponding in position with and engaging apertures in the bosses $l^3$, $l^4$ of the plates $l'$, $l^2$ of the displacing element. The shaft $i$ also carries a balance weight $o^3$ fixed thereon midway between the two eccentrics in order to secure perfect balance. A packing gland $n^4$ may be provided where the shaft enters.

The plate $l^2$ is provided with engagement pins $p$, such pins being arranged around preferably at say four points equidistant from the center of the shaft $i$ and each other. These pins engage apertures formed eccentrically in disks $q$, rotably mounted in the covers on anti-friction balls. The disks $q$ form guide crank disks of the same throw as the eccentrics $o'$, $o^2$.

When the shaft $i$ is rotated motion is imparted to the displacing element $l$, $l'$, $l^2$ by means of the eccentrics $o'$, $o^2$. The guide crank disks $q$ $q$ of which any desired number may be employed insure that all portions of the displacing element execute a similar movement, that is every point moves in a circle of the same radius as the eccentrics. This movement is for convenience herein termed a paracyclic motion. The band or strip $l$ therefore, moves in the conduit in such a manner that contact with the inner and outer walls respectively is maintained at two remote regions upon opposite sides of the axis of the shaft $i$ as before described, said zones of contact traveling around the conduit path and insuring the displacement of fluid filling the conduit $a$ upon both sides of the displacing element.

Where higher pressures are contemplated and it is desired to render substantially fluid tight the joint made at the points of contact between the displacing element and the conduit during the movement of the displacer, suitable resilient packing rings or strips, say of fiber, metal or other suitable material may be fixed upon any suitable surface either of the conduit or the displacer. Packing may also be interposed between the inner faces of the cover plates and the outer surface of the conduit casing.

One form of packing of a type suitable for use around the edges of the conduit casing and transversely across the width of any of the flat sides is shown at Figs. 7, 8 and 9. Fig. 7 representing a view to a larger scale of any of the portions such as $d'$, $e'$, etc., looking in the same direction as Fig. 2, and Figs. 8 and 9 represent sections on the lines 8 and 9 respectively of Fig. 7.

In this packing $r$ represents a packing strip carried in a groove all around the perimeter of the edge of the conduit, while $s$ represents a transverse bar, one of which may be provided preferably at each of the flat surfaces. The bars $s$ are provided with outwardly beveled edges which fit in dovetail grooves cut across the width of the sides and also across the strips $r$, and the bands are also provided at the middle of their length with plungers or studs $s'$ fitting in holes at the bottom of the dovetail grooves and pressed outward by means of springs $t$ so as to hold the packing at its extreme outward position. Springs $u$ are also provided in holes formed at the bottom of the grooves receiving the strips $r$, and these springs keep the strips $r$ pressed tightly against the inner surfaces of the projecting flanges of the closing plates $l'$, $l^2$. Any other suitable form of packing may, however, be employed.

Figs. 4, 5 and 6 show some other of the numerous forms which may be taken by the conduit, a suitable displacing element being in each case indicated by two parallel black lines. Where a slight leakage is not of importance any of these shapes may be employed without packing. Where leakage is of importance a form such as shown at Fig. 5 may be provided with packing only at the four rounded corners, or in a form such as shown in Figs. 1 and 2, packing of the type illustrated in Figs. 7 to 9 or other suitable type may be employed in strips across the center of each of the flat sides.

For a six-sided figure the amount of movement possible for the bars $s$ must be equal to the greatest distance between the arc and cord of an angle of 60 degrees, or where a greater number of sides are employed, the movement may be decreased in accordance with the smaller angles embraced by the sides.

Instead of guide crank disks as shown at $q$ Fig. 1, the displacer element may be provided upon one or both sides with a suitable number of projecting circular recesses as shown at Fig. 3 which are engaged by rollers $q'$ mounted upon studs $q^2$ secured to the cover of the conduit casing, or the recesses may be provided upon the covers and suitable rollers for engaging therewith be provided upon the displacer element.

By the employment of a suitable number of guides as hereinbefore described to insure that paracyclic motion is imparted to the displacer element it is possible to employ conduits and displacer elements of any desired length and consequent capacity without increasing the friction between the displacer element and the sides of the conduit, and although the friction of the closing plates with the periphery of the conduit sides is increased, a very considerable gain in efficiency upon the methods usually employed is still obtained.

Although described in connection with pumping apparatus it is to be understood that the foregoing constructions with suitable additions where necessary may be utilized for prime mover devices such as hydraulic steam or internal combustion engines.

It is to be noted that the foregoing descriptions comprise only some ways of carrying the invention into effect and that other modifications can be made such as the employment of a plurality of conduits arranged side by side or two conduits with two independent moving elements the said elements being set opposite each other for balancing purposes. Or again one conduit could be employed having two moving displacing elements contacting with each other and the sides of the conduit. This arrangement also obviates the use of a balance weight as herein described.

Having now described my invention, what I claim as new and desire to secure by Letters Patent is:—

1. In combination in a rotary engine or pump a conduit of substantially uniform transverse section throughout its length disposed around an axis in a figure approximating to a single turn of any configuration, a band-like displacer element of similar figure to said conduit positioned and movable therein normally to said axis, and means arranged at various positions relative to the axis of the displacer for similarly constraining the relative movement of said displacer and conduit elements so that every point of the former moves within the latter in a circle, the diameter of which is less than the breadth of the conduit.

2. In combination in a rotary engine or pump a conduit of substantially uniform transverse section throughout its length disposed around an axis in a figure approximating to a single turn of any configuration with unrestricted inlet and outlet branches at the two ends thereof, a band-like displacer element of similar figure to said conduit positioned and movable therein normally to said axis, and means one at least of which constitutes actuating means arranged at a plurality of positions with respect to the axis of the displacer element for similarly constraining the relative movement of said displacer and conduit elements so that every point of the former moves within the latter in a circle the diameter of which is less than the breadth of the conduit.

3. In combination in a rotary engine or pump a conduit of substantially uniform transverse section throughout its length disposed by deflection through 360 degrees in a figure constituting a single turn of varying curvature, a band-like displacer element of similar figure to said conduit positioned and movable therein and means one at least of which constitutes actuating means at a plurality of positions for similarly constraining the relative movement of said displacer and conduit elements so that every point of the former moves within the latter in a circle the diameter of which is less than the breadth of the conduit.

4. In combination in a rotary engine or pump a conduit of substantially uniform transverse section throughout its length disposed by deflection through 360 degrees in the form of a multi-sided figure with unrestricted inlet and outlet branches at the two ends thereof, a band-like displacer element of similar figure to said conduit positioned and movable therein, and means one at least of which constitutes actuating means at a plurality of positions for similarly constraining the relative movement of said displacer and conduit elements so that every point of the former moves within the latter in a circle the diameter of which is less than the breadth of the conduit.

5. In combination in a rotary engine or pump, a conduit of substantially uniform transverse section throughout its length disposed around an axis in a figure approximating to a single turn of any configuration, a band-like displacer element of similar figure to said conduit positioned and movable therein normally to said axis, means arranged at a plurality of points equidistant to the axis of the displacer element for similarly constraining the relative movement of said displacer and conduit elements so that every point of the former moves within the latter in a circle, the diameter of which is less than the breadth of the conduit, and packing comprising bars having flat rubbing surfaces supported in one of the relatively movable elements and by reason of the paracyclic motion maintaining parallel relationship with suitable co-acting surfaces of the other relatively movable element.

6. In combination in a rotary engine or pump, a conduit of substantially uniform transverse section throughout its length disposed by deflection through 360 degrees in the form of a multi-sided figure with unrestricted inlet and outlet branches at the two ends thereof, a band-like displacer element of similar figure to said conduit positioned and movable therein, means one at least of which constitutes actuating means at a plurality of positions for similarly constraining the relative movement of said displacer and conduit elements so that every point of the former moves within the latter in a circle the diameter of which is less than the breadth of the conduit, and packing comprising bars having flat rubbing surfaces supported in one of the relatively movable elements and by reason of the paracyclic motion maintaining parallel relationship and co-acting each in turn with a separate one of a series of limited prepared flat surfaces of the other relatively movable element.

7. In combination in a rotary engine or pump, a conduit of substantially uniform transverse section throughout its length disposed around an axis in a figure approximating to a single turn of any configuration, a band-like displacer element of similar figure to said conduit positioned and movable therein normally to said axis, means at a plurality of positions for similarly constraining the relative movement of said displacer and conduit elements so that every point of the former moves within the latter in a circle, the diameter of which is less than the breadth of the conduit, and packing comprising resilient bars of rubbing surface supported in one of the relatively movable elements and by reason of the paracyclic motion maintaining parallel relationship and co-acting each in turn with a separate one of a series of limited prepared surfaces of the other relatively movable element.

8. In combination in a rotary engine or pump, a conduit of substantially uniform transverse section throughout its length disposed by deflection through 360 degrees in the form of a multi-sided figure, a band-like displacer element of similar figure to said conduit positioned and movable therein, means one at least of which constitutes actuating means at a plurality of positions for similarly constraining the relative movement of said displacer and conduit elements so that every point of the former moves within the latter in a circle the diameter of which is less than the breadth of the conduit, and packing comprising bars having flat rubbing surfaces resiliently supported one to each of the sides of the figure in one of the relatively movable elements and by reason of the paracyclic motion maintaining parallel relationship and co-acting each with a separate surface of the other relatively movable element.

9. In combination in a rotary engine or pump a conduit of substantially uniform transverse section throughout its length disposed around an axis in a figure approximating to a single turn of any configuration, a band-like displacer element of similar figure to said conduit positioned and movable therein normally to said axis, a rotating shaft carrying eccentrically displaced driving means engaging said displacer element, at least one other engaging means for similarly constraining the relative movement of said displacer and conduit elements so that every point of the former moves within the latter in a circle the diameter of which is less than the breadth of the conduit, and balancing means moving with the same angular velocity as the driving shaft to completely balance the moving masses.

10. In combination in a rotary engine or pump a conduit of substantially uniform transverse section throughout its length disposed by deflection through 360 degrees in the form of a multi-sided figure with unrestricted inlet and outlet branches at the two ends thereof, a band-like displacer element of similar figure to said conduit positioned and movable therein, a rotating shaft carrying eccentrically displaced driving means engaging said displacer element, at least one other engaging means for similarly constraining the relative movement of said displacer and conduit elements so that every point of the former moves within the latter in a circle the diameter of which is less than the breadth of the conduit and balancing means moving with the same angular velocity as the driving shaft to completely balance the moving masses.

In testimony whereof I have signed my name to this specification.

CROMWELL HANFORD VARLEY.